United States Patent
Mardberg et al.

(10) Patent No.: US 6,640,566 B2
(45) Date of Patent: Nov. 4, 2003

(54) DEVICE AND METHOD FOR AUTOMATIC DEFROSTER IN CARS

(75) Inventors: Bjorn Mardberg, Gothenburg (SE); Magnus Svensson, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 10/248,340

(22) Filed: Jan. 10, 2003

(65) Prior Publication Data

US 2003/0131613 A1 Jul. 17, 2003

Related U.S. Application Data

(63) Continuation of application No. PCT/SE01/01572, filed on Jul. 6, 2001.

(30) Foreign Application Priority Data

Jul. 10, 2000 (SE) .............................................. 0002609

(51) Int. Cl.[7] .............................................. F25D 21/00
(52) U.S. Cl. ...................................... 62/156; 165/204
(58) Field of Search ........................ 62/151, 156, 157, 62/176.2, 80; 165/204

(56) References Cited

U.S. PATENT DOCUMENTS

| | | | | |
|---|---|---|---|---|
| 4,910,967 A | | 3/1990 | Takahashi | |
| 5,072,597 A | * | 12/1991 | Bromley et al. | ............... 62/209 |
| 5,088,298 A | * | 2/1992 | Fujii | .......................... 62/228.5 |
| 5,181,389 A | * | 1/1993 | Hanson et al. | ................. 62/126 |
| 5,516,041 A | | 5/1996 | Davis, Jr. et al. | |
| 5,530,885 A | * | 6/1996 | Kagohata | ...................... 700/90 |
| 5,564,285 A | * | 10/1996 | Jurewicz et al. | ............... 62/127 |
| 5,579,994 A | | 12/1996 | Davis, Jr. et al. | |
| 6,178,760 B1 | * | 1/2001 | Tanaka et al. | ................. 62/154 |
| 6,196,009 B1 | * | 3/2001 | Nishi et al. | .................... 62/155 |
| 6,247,530 B1 | * | 6/2001 | Mochizuki et al. | .......... 165/204 |

* cited by examiner

Primary Examiner—William E. Tapolcai
Assistant Examiner—Mohammad M. Ali
(74) Attorney, Agent, or Firm—Howrey Simon Arnold & White LLP

(57) ABSTRACT

Method and apparatus for providing an automatic defroster function for a surface in a vehicle including a sensor for detecting the presence of mist or ice on such a surface, means for generating control signals, on the basis of the sensor data, for a number of functions in the car for an optimum defroster function on said surface, means for receiving these control signals, and means for receiving control signals from a temperature regulator in the car for a number of functions in the car. A number of the control signals from the temperature regulator are intended to control the same functions as the control signals for the optimum defroster function, and the same means are used for receiving control signals for optimum defroster function and for receiving some of the control signals from the temperature regulator. The means for receiving control signals are intended, in the event of conflict, to select those control signals that are designed to give the best defroster function.

23 Claims, 4 Drawing Sheets

DEVICE AND METHOD FOR AUTOMATIC DEFROSTER IN CARS

CROSS REFERENCE TO RELATED APPLICATIONS

This application is a continuation patent application of International Application No. PCT/SE01/01572 filed Jul. 6, 2001 which was published in English pursuant to Article 21(2) of the Patent Cooperation Treaty, and which claims priority to Swedish Application No. 0002609-6 filed Jul. 10, 2000. Both applications are expressly incorporated herein by reference in their entireties.

BACKGROUND OF INVENTION

1. Technical Field

The present invention relates to a method and device for automatic de-misting and de-icing, using what is typically referred to as a defroster, a surface, for example a window, and particularly windows in automobiles.

2. Background Art

A common way of regulating the passenger compartment temperature in a car is to use so-called automatic climate control, a function that generates control signals for a number of different functions in the car. An example is found in the built-in air-conditioning system of an automobile in which the desired passenger compartment temperature is automatically maintained.

A further aim of automatic climate control can be to ensure that the car windows, primarily the windscreen, are kept free of mist, thereby establishing a so-called defroster function. For this purpose, the automatic climate control ensures that dry and warm air is directed at the windscreen. Since the climate control system does not know whether the windscreen is misted up or not, this will occur irrespective of whether or not it is required. Since the control, heating and cooling of air are activities and operations that require energy, fuel consumption consequently also increases irrespective of whether or not conditions actually exist that would require the defrosting function. Some of the adjustments which are made by know automatic climate control arrangements, in order to achieve the desired passenger compartment temperature, can actually run counter to the objective of achieving optimum demisting.

If the windscreen is completely or partially covered with ice, possibly in combination with mist, the climate control system will perhaps be unable to direct sufficient amounts of dry and warm air at the windscreen, in which case the driver has to take some course of action, for example press a button to activate the desired demisting function. This applies, for example, in cases where the windscreen has suddenly iced over as a result of driving into a cold environment.

Sensors that detect the presence of mist or ice on a surface such as a car window are known and can function according to a number of different principles; for example, by optical detection or by detection of air moisture content. The use of this information from such a sensor is, however, not known in conjunction with a climate control system in a car in ways that give optimum and automatic demisting.

SUMMARY OF INVENTION

One goal of the present invention is to use information from a sensor for detecting the presence of mist or ice on a surface, for example a car window, and, with the aid of a system for climate control or temperature regulation in the car, to achieve optimum automatic demisting, defroster function, on the surface.

The invention utilizes the aid of a device in an automatic defrosting function for a surface in a car; typically the windscreen or other window. The device exemplarily includes a sensor for detecting the presence of mist or ice on the surface of interest. A means, preferably in the form of an information processing unit, is utilized for generating control signals on the basis of the mist sensor data for a number of functions in the car, including optimizing the defroster function on the observed surface. A means is also included for receiving these control signals. The device further includes means for receiving control signals for a number of functions in the car from a function for temperature regulation.

In the arrangement, some of the control signals from the temperature regulator are intended to control the same functions in the car as the control signals for the optimum defroster function, and the same means are also used for receiving control signals for optimum defroster function and for receiving a number of the corresponding control signals from the temperature regulator. The means for receiving control signals are intended, in the event of conflict, to select those control signals that are designed to give the best demisting. This ensures that an automatic and efficient defroster function can at all times be achieved using an arrangement according to the invention, as well as the methods indicated thereby. The fact that the selected control signals are the ones that produce the greatest demisting means that when the function for optimum defrosting has generated a control signal giving less defrosting than the temperature regulator, the control signal from the temperature regulator is selected.

Since the invention provides the possibility of selecting which of the control signals from the temperature regulator are connected to the same means as the control signals for the defroster function, it is possible to determine which of the control signals from the temperature regulator will be included in this selection.

The means for generating control signals for an optimum defroster function preferably also include means for storing and reading off the values for the functions of the respective control signals, where the stored values give the optimum defroster function for certain input data from the sensor for detecting the presence of mist or ice. In this way, suitable or optimum values for the respective functions for different input data from the mist sensor can be calculated or tested out and stored in advance and then used as, and when required.

BRIEF DESCRIPTION OF DRAWINGS

The invention will be described in greater detail below on the basis of illustrative embodiments and with reference to the attached drawings, in which.

DETAILED DESCRIPTION

Figure 1:
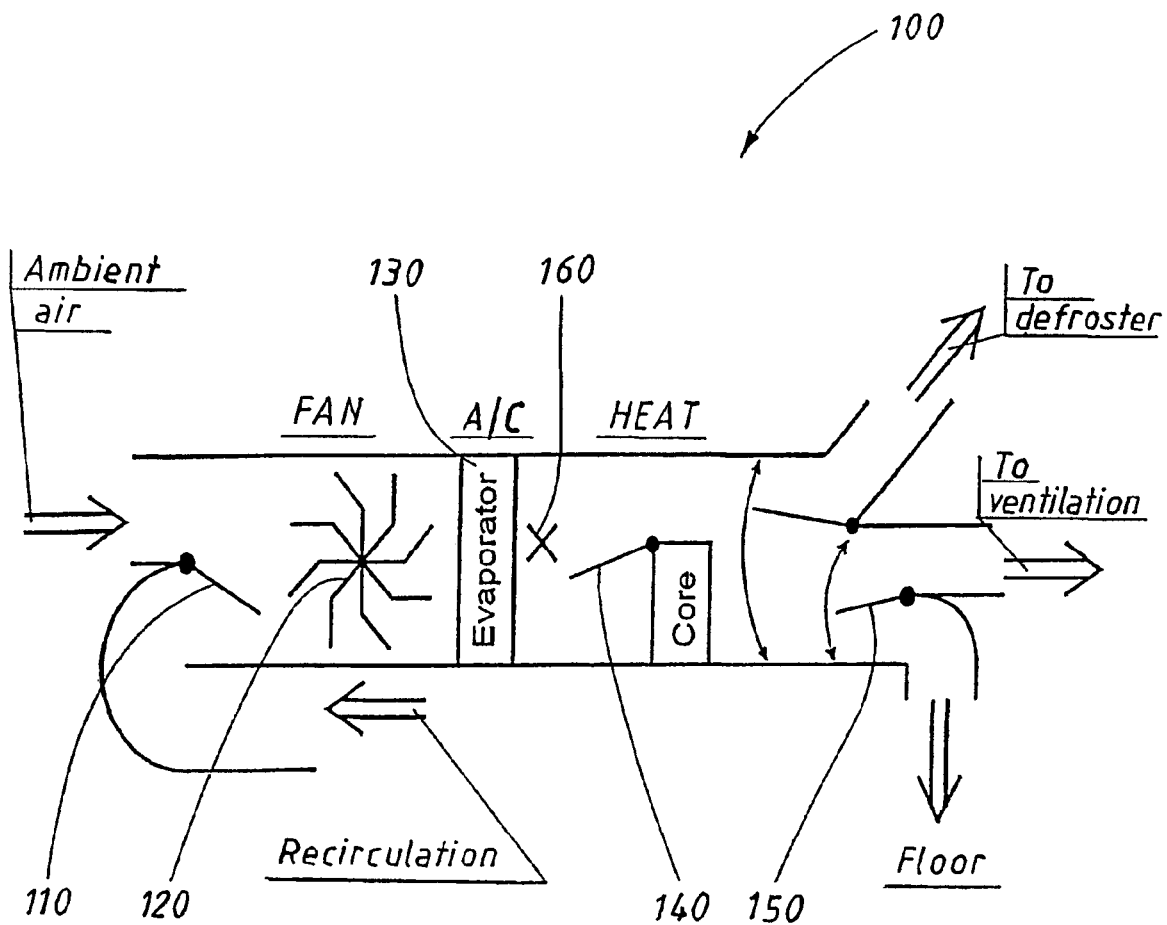
FIG. 1 shows a diagrammatic representation of a climate control system in a car.

FIG. 1 gives an overview of the different functions in a system 100 for automatic climate control in an automobile. The main features and functions include a valve 110 which controls how much of the air drawn into the system will come from the passenger compartment or the environment outside the vehicle. Also included are a fan 120, an evaporator 130 which forms part of an air-conditioning system, a heat valve 140 that controls how much of the air in the system will be guided past a heat source, and one or more valves 150 which regulate in which direction or directions in the car the air from the system for climate control is to be guided.

The system also includes a sensor 160 for detecting the air temperature after air-conditioning, and which is used to control the air-conditioning so that the desired degree of air humidity can be achieved.

On the basis of a number of input or set values, the system 100 for automatic climate control will generate, for the abovementioned functions, control signals which are intended to give the desired passenger compartment temperature. The values that are used as input can include the outside temperature, the strength of the sun, and of course the selected passenger compartment temperature that has been set.

According to the invention, a sensor is used which can detect the presence of mist or ice on a surface in order to detect mist or ice formation on a car window; most typically, the windscreen. Similar sensors, however, can of course be used to detect the presence of mist on other windows or surfaces in the car; that is, the present invention is not limited to defrosting windshields. The sensor outputs a value which indicates whether there is mist or ice on the window and, if so, how much. The sensor is preferably calibrated so that the value lies between zero and one, or, alternatively, the output signal from the sensor is scaled so that it lies between zero and one.

Figure 2:
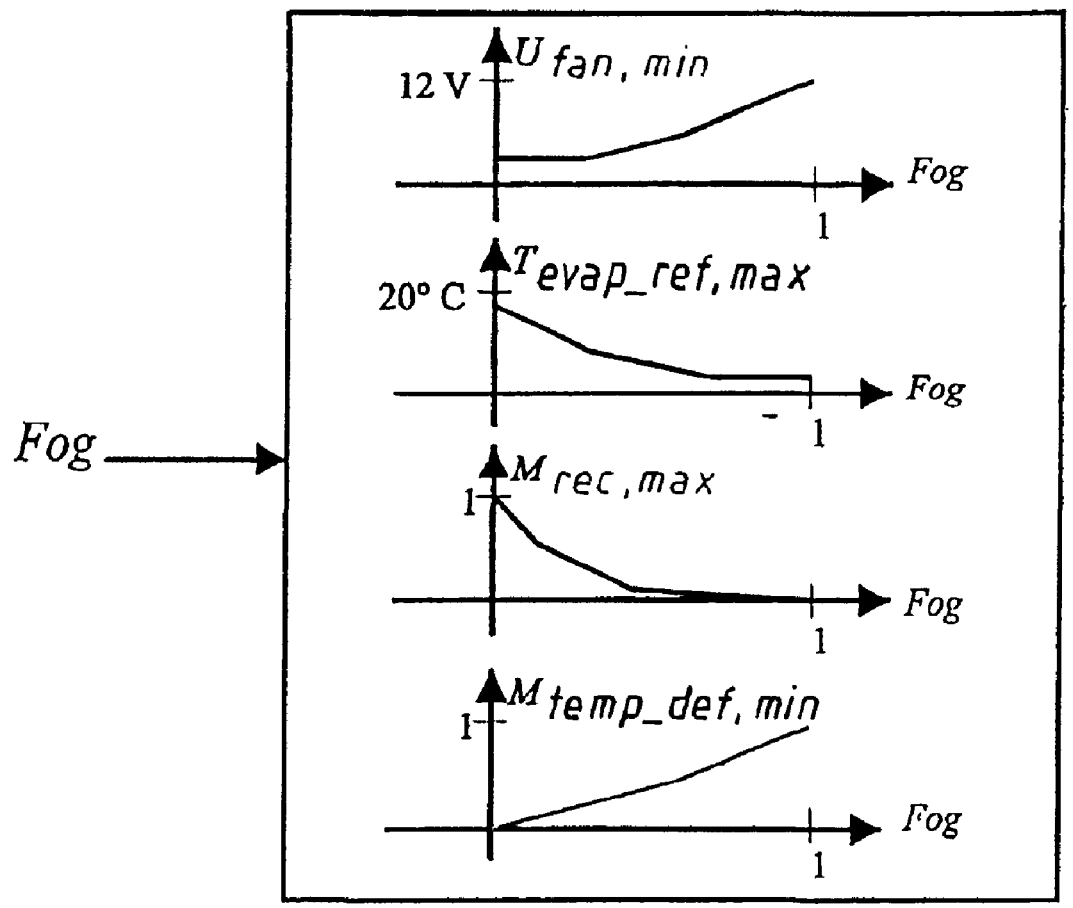
FIG. 2 shows a number of graphs representative of system characteristics for automatic defrosting according to the invention and which are exemplified as a lower limit fan speed (Ufan_min), an upper limit post-evaporator temperature (Tevap_ref_max), an upper limit degree of circulation (Mrec_max), and a lower limit degree of air sent to defrost outlets.

To ensure that the optimum defroster function is achieved, the invention includes means which, on the basis of the value from the mist sensor, generates control signals for a number of the functions in the system for automatic climate control, as is shown diagrammatically in FIG. 2. These functions will be controlled for optimum defroster function on the basis of the value from the mist sensor and include the voltage to the fan for controlling the speed of rotation of the fan, the air temperature after air-conditioning, the degree of recirculation of the air in the climate control system, and control of the air temperature in the passenger compartment via the position of the heat valve.

Since the temperature regulation and the automatic defroster function in the car will generate their individual sets of control signals for a number of functions in the climate control system, a "conflict" may arise. According to the invention, this is solved by the fact that a number of the control signals for the temperature regulation and a number of the control signals from the defroster function are interconnected to a means which, if there are different control signals for one and the same function, will select one of the control signals. The control signal that is selected is the one that gives the most demisting. It should be noted that the control signal which gives the most demisting is not always the control signal generated by the defroster function. If there is no mist on the window, the defroster function will, for example, generate a control signal for a low fan speed, which means that the temperature regulation can generate a control signal for a higher fan speed, which gives a greater defrosting effect.

The means for selecting the control signal can be realized in many different ways, either using hardware or software, but preferably using software.

As regards the control signals for the heat valve position that are generated by the defroster function or temperature regulation, these control signals can be treated in different ways. They can be connected up to the means for selecting a control signal so that the valve position selected is the one giving the best demisting, or the passenger compartment temperature can be given priority for this control signal. In one preferred embodiment of the invention, the passenger compartment temperature is given priority.

Figure 3:
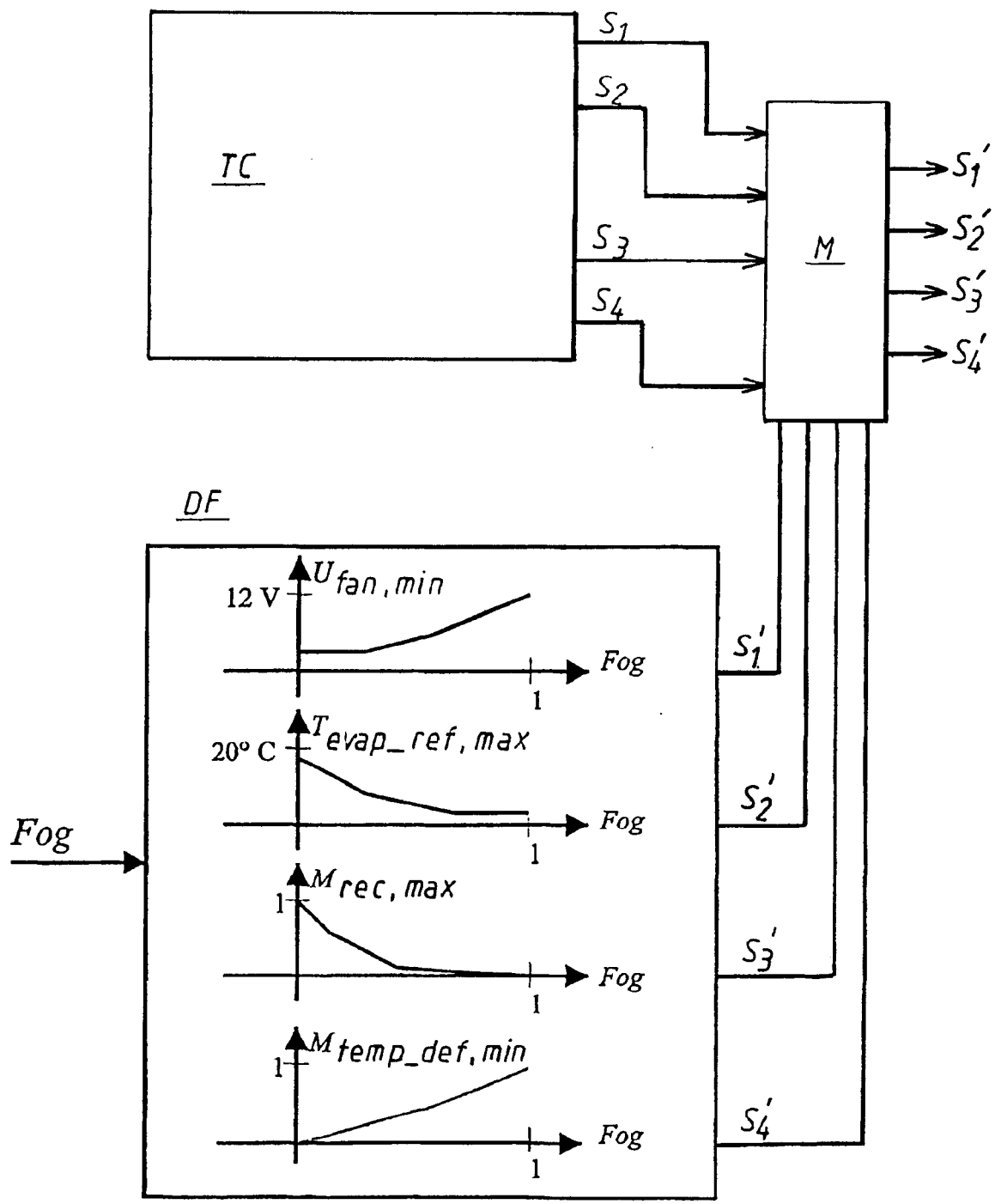
FIG. 3 represents an exemplary utilization of the information from the graphs in FIG. 2 as input for a control process.

The selection of the control signal is illustrated in FIG. 3, where the system for temperature regulation is designated as TC (temperature control), and where the control signals from TC for the different functions have been designated as $S_1$–$S_4$, and corresponding control signals for optimum defroster function (DF) have been designated as $S'_1$–$S'_4$. As may be appreciated from FIG. 3, the signals from TC and the signals for optimum demisting (DF) are connected up to a means for selecting control signals (M), This means selects the control signal which gives optimum demisting. The number of control signals shown is four, which is of course only one example, since in principle any number of control signals can be used in a device and a method configured and conducted according to the present invention.

A suitable way of-generating control signals for an optimum defroster function based on the value from the mist sensor is to use graphs or look-up tables that give previously measured or calculated values for the different control signals depending on input data from the mist sensor. Examples of exemplary graphs are shown in FIG. 2.

Figure 4:
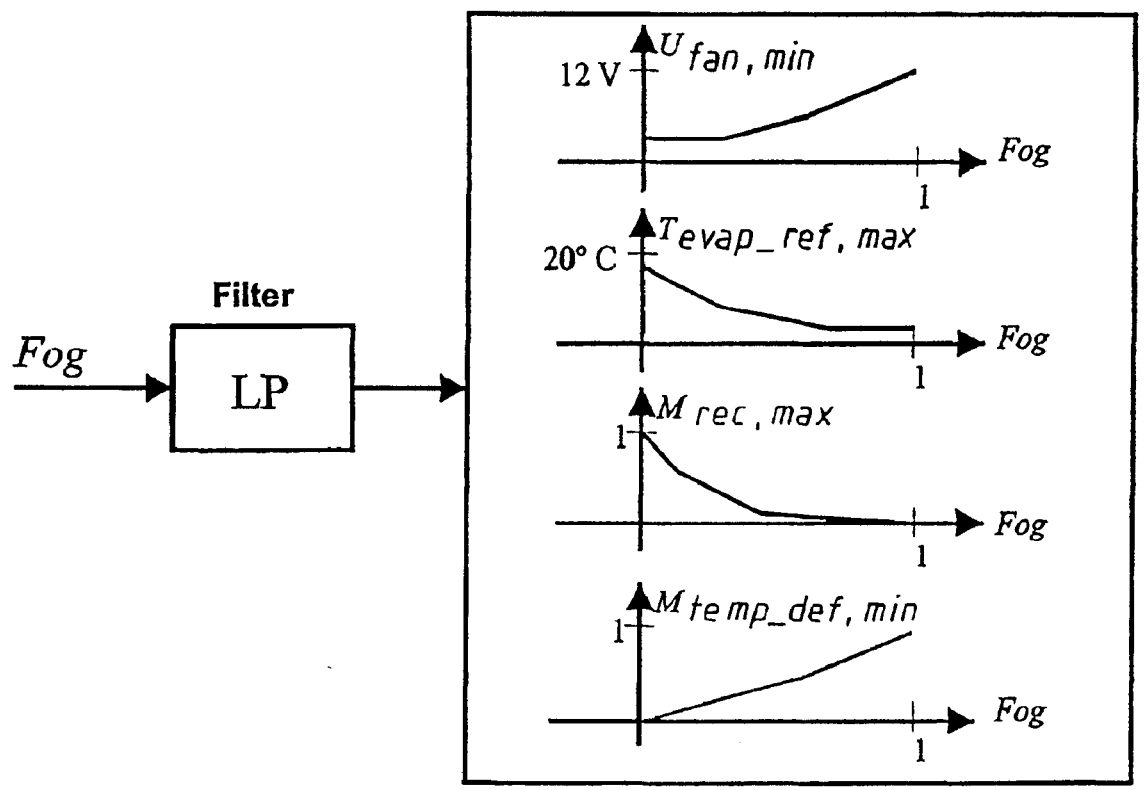
FIG. 4 illustrates an exemplary way of obtaining the graphs of FIG. 2.

FIG. 4 illustrates an alternative embodiment of the invention. Output data from the mist sensor is connected to a low-pass filter before the control signals are generated. This is done in order to ensure that regulation of the defroster function is not effected too quickly and in order to remove noise components in the output signal from the mist sensor. Another possibility is to filter those control signals that are generated by the defroster function in order to obtain different speeds of the different control signals.

The invention is not limited to the illustrative embodiments described above and instead can be freely modified within the scope of the attached patent claims. Of course, more than one sensor can be used at the same time to detect the presence of mist, and in this case the different sensors used can function according to different sensor principles. An example of a sensor principle other than an optic sensor is a moisture sensor. With the aid of the information from a moisture sensor and a temperature sensor, the dew point of the passenger compartment air can be calculated. The dew point can be compared with the temperature of the actual surface, for example a window, which is known from a temperature sensor, or possibly from some form of estimating with the aid of a temperature model. This also means that it is possible to estimate the risk of mist formation. The temperature of the window or of the surface can in such cases be measured using a contact-free technique; for example, using an IR sensor.

As examples of other types of sensors which can be used instead of, or in addition to the types of sensors described above, mention is made of sensors that detect the number of persons in the car, the number of times the car doors are opened, which of the car doors are open, and/or detect whether the windscreen wipers of the car are in operation; any of which can be used as a sign of high air moisture content.

A sensor can also be used to detect the presence of mist or ice on the rear window. This type of functionality can be used to control the electric wires or other heating apparatus used to demist the rear window. It is also conceivable to arrange electric wires on or in the windscreen and to control these according to the invention.

In warm and humid climates, mist can form on the outside of the windscreen as a result of blowing too much cold air onto the window. This can be counteracted by having sensors for outside temperature and air humidity and allowing data from these sensors to act on the defroster function.

In another variant of the invention, the driver can act on the defroster function via a variable knob with which the driver indicates how much defroster function is desired.

As regards the tables for control signals that have been described above, values can either be taken directly from the tables, or the values found in the tables can be interpolated.

It should also be appreciated that the present inventions, in the several formats, find applicability in a wide range of vehicles, of which one example is an automobile.

What is claimed is:

1. An arrangement for producing an automatic defroster function for a surface of a vehicle, said arrangement comprising:
   a sensor that detects the presence of mist or ice on a surface of a vehicle;
   means for generating control signals, based on data from the sensor data, for a number of functions in the vehicle for producing an optimum defroster function on the surface;
   means for receiving the control signals and means for receiving the control signals from a temperature regulator in the vehicle for controlling a number of functions in the vehicle, a number of the control signals from the temperature regulator available to control the same functions as the control signals for the optimum defroster function;
   said means for receiving control signals for optimum defroster function and for receiving some of the control signals from the temperature regulator being incorporated in a common control means, and
   said means for receiving control signals, in the event of conflict, selecting those control signals that are designed to give the best defroster function.

2. The arrangement as recited in claim 1, wherein said means for generating control signals for optimum defroster function include means for storing and reading off the values for each function, which values give the optimum defroster function for certain input data from the sensor for detecting the presence of mist or ice.

3. The arrangement as recited in claim 1, wherein said functions for which control signals can be generated by the defroster function include the speed of rotation of a fan, the air temperature after the vehicle's air-conditioning, the degree of recovery of passenger compartment air, and the distribution of air in the car.

4. A method for achieving an automatic defroster function for a surface in a vehicle, said method comprising the steps of:
   detecting the presence of mist or ice on a surface of a vehicle;
   generating control signals on the basis of said detection for a number of functions in the vehicle for an optimum defroster function on the surface; and
   receiving these generated control signals, together with control signals from a temperature regulator in the vehicle for a number of functions in the vehicle; and controlling the same functions utilizing a selection of the control signals from the temperature regulator as the control signals for optimum defroster function, and, in the event of conflict between some of the control signals from the temperature regulator and corresponding control signals from the defroster function, control signals are selected that give the most demisting.

5. The method as recited in claim 4, wherein said generation of control signals for optimum defroster function comprises reading off the stored values for each function, which stored values give an optimum defroster function for certain input data upon detection of the presence of mist or ice.

6. The method as recited in claim 4, wherein said functions for which control signals can be generated for optimum defroster function include the speed of rotation of a fan, the air temperature after the car's air-conditioning, the degree of recovery of passenger compartment air, and the distribution of air in the car.

7. A method for achieving an automatic defroster function for a surface in a vehicle, said method comprising the steps of:
   analyzing at least one variable indicative of existing conditions of a vehicle, said at least one variable including at least one variable indicative of the presence of moisture collection on a surface of the vehicle and producing a defrost-control output variable for use in a defrosting procedure for the surface;
   ascertaining a desired passenger compartment temperature condition based on passenger comfort and producing a temperature-control output variable; and
   considering said defrost-control output variable and said temperature-control output variable, and based upon the consideration of both of the output variables, issuing a set of control parameters for an automatic climate control system of the vehicle.

8. The method as recited in claim 7, further comprising: comparing said temperature-control output variable with said defrost-control output variable and determining that control of said automatic climate control system of the vehicle based on said temperature-control output variable will produce sufficient defrosting capacity from said automatic climate control system.

9. The method as recited in claim 8, further comprising: controlling said automatic climate control system based on said temperature-control output variable.

10. The method as recited in claim 7, further comprising: comparing said temperature-control output variable with said defrost-control output variable and determining that control of said automatic climate control system of the vehicle based on said temperature-control output variable will not produce sufficient defrosting capacity from said automatic climate control system.

11. The method as recited in claim 10, further comprising: controlling said automatic climate control system based on said defrost-control output variable.

12. The method as recited in claim 7, further comprising: comparing said temperature-control output variable with said defrost-control output variable and determining whether control of said automatic climate control system of the vehicle based on said temperature-control output variable will produce sufficient defrosting capacity from said automatic climate control system.

13. The method as recited in claim 12, further comprising: controlling said automatic climate control system based on said defrost-control output variable when it is determined that control of said automatic climate control system of the vehicle based on said temperature-control output variable will not produce sufficient defrosting capacity from said automatic climate control system.

14. The method as recited in claim 12, further comprising:
controlling said automatic climate control system based on said temperature-control output variable when it is determined that control of said automatic climate control system of the vehicle based on said temperature-control output variable will produce sufficient defrosting capacity from said automatic climate control system.

15. The method as recited in claim 7, wherein said ascertainment of the desired passenger compartment temperature condition is made based on an operator controlled input.

16. The method as recited in claim 7, wherein said consideration of said defrost-control output variable and said temperature-control output variable further includes determining whether said automatic climate control system will supply air of sufficient dryness to meet requirements based on said defrost-control output variable if said automatic climate control system is controlled based exclusively on said temperature-control output variable.

17. The method as recited in claim 7, further comprising:
determining a surface's capacity for collecting moisture thereupon by taking a temperature reading of said surface.

18. The method as recited in claim 17, further comprising:
utilizing an infrared-based sensor to determine the temperature reading of said surface.

19. The method as recited in claim 18, further comprising:
taking said temperature reading from a windscreen of the vehicle.

20. The method as recited in claim 18, further comprising:
utilizing a processor for analyzing said at least one variable indicative of existing conditions of a vehicle, including treating sensed data in a low-pass filter to ensure that the function of the automatic defroster is not effected too quickly and in order to remove noise therefrom.

21. A method for controlling a defrosting function of an automatic climate control system of a vehicle, said method comprising the steps of:
based on sensed conditions, generating a set of control commands for configuring an automatic climate control system of a vehicle to induce a defrosting function at the vehicle;
based on operator input designating a climate comfort setting, generating a set of control commands for configuring the automatic climate control system of the vehicle to establish the climate comfort conditions indicated by the operator;
determining whether establishment of the operator prescribed climate comfort conditions will induce a defrosting function at the vehicle at least equal to that prescribed based on sensed conditions; and
operating the automatic climate control system according to the determination in order to assure that satisfactory defrosting effect is achieved at the vehicle.

22. The method as recited in claim 21, further comprising:
causing the set of control commands for configuring the automatic climate control system to induce a defrosting function to override the set of control commands for configuring the automatic climate control system based on climate comfort conditions when the generated set of control commands for establishing the operator prescribed climate comfort conditions will not provide a defrosting effect at least equal to the generated set of control commands based on sensed conditions.

23. The method as recited in claim 21, further comprising:
causing the set of control commands for configuring the automatic climate control system to establish the climate comfort conditions indicated by the operator to override the set of control commands for configuring the automatic climate control system to induce a defrosting function at the vehicle when the generated set of control commands for establishing the operator prescribed climate comfort conditions will provide a defrosting effect at least equal to that which would be induced from the generated set of control commands based on sensed conditions.

* * * * *